United States Patent
Nagaoka et al.

(10) Patent No.: US 10,061,277 B2
(45) Date of Patent: Aug. 28, 2018

(54) SERVO CONTROL DEVICE WITH COARSE AND FINE MOVEMENT

(71) Applicants: Kotaro Nagaoka, Tokyo (JP); Teruaki Fukuoka, Tokyo (JP); Takahiro Nakai, Tokyo (JP)

(72) Inventors: Kotaro Nagaoka, Tokyo (JP); Teruaki Fukuoka, Tokyo (JP); Takahiro Nakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 502 days.

(21) Appl. No.: 14/374,120

(22) PCT Filed: Dec. 20, 2012

(86) PCT No.: PCT/JP2012/083140
§ 371 (c)(1),
(2) Date: Jul. 23, 2014

(87) PCT Pub. No.: WO2015/118404
PCT Pub. Date: Aug. 15, 2013

(65) Prior Publication Data
US 2014/0371916 A1    Dec. 18, 2014

(30) Foreign Application Priority Data
Feb. 8, 2012    (JP) .................. 2012-025542

(51) Int. Cl.
*G05B 13/04* (2006.01)
*G05D 3/12* (2006.01)
(Continued)

(52) U.S. Cl.
CPC .......... *G05B 13/04* (2013.01); *B23Q 15/013* (2013.01); *G05B 19/19* (2013.01); *G05B 19/402* (2013.01);
(Continued)

(58) Field of Classification Search
CPC ......... G05B 13/04; G05B 19/19–19/40; G05B 19/402; G05B 2219/41105–2219/41107;
(Continued)

(56) References Cited

U.S. PATENT DOCUMENTS 5,262,707 A * 11/1993 Okazaki ............... G05D 3/1436
                                                                318/590
5,751,585 A    5/1998 Cutler et al.
(Continued)

FOREIGN PATENT DOCUMENTS

JP    07-168625    7/1995
JP    3009740     2/2000
(Continued)

OTHER PUBLICATIONS

International Search Report dated Feb. 26, 2013 in PCT/JP12/083140 filed Dec. 20, 2012.
(Continued)

*Primary Examiner* — Todd Aguilera
(74) *Attorney, Agent, or Firm* — Oblon, McClelland, Maier & Neustadt, L.L.P.

(57) ABSTRACT

A servo control device includes a coarse-movement reference model unit calculating a coarse-movement model position by performing predetermined filter computation based on a position command; a coarse-movement follow-up control unit controlling the coarse-movement shaft motor such that a coarse-movement-shaft motor position follows the coarse-movement model position based on the coarse-movement-shaft motor position provided from the coarse-movement shaft motor and the coarse-movement model position; an integrated reference model unit calculating an integrated model position by performing predetermined filter computation based on a position command; and a fine-movement follow-up control unit controlling the fine-movement shaft
(Continued)

motor such that a fine-movement-shaft motor position follows a fine-movement model position based on the fine-movement-shaft motor position provided from the fine-movement shaft motor and the fine-movement model position obtained from the integrated model position and the coarse-movement model position.

20 Claims, 5 Drawing Sheets

(51) Int. Cl.
    *G05B 19/402*     (2006.01)
    *G05B 19/19*     (2006.01)
    *B23Q 15/013*     (2006.01)

(52) U.S. Cl.
    CPC ...... *G05D 3/12* (2013.01); *G05B 2219/41105* (2013.01); *G05B 2219/42209* (2013.01); *G05B 2219/42225* (2013.01); *G05B 2219/45207* (2013.01)

(58) Field of Classification Search
    CPC ........... G05B 2219/42225; G05B 2219/42209; G05B 2219/45207; B23Q 15/00; B23Q 15/013; B23Q 15/14; B23Q 15/22; G05D 3/1436; G05D 3/203; G05D 3/00; G05D 3/10; G05D 3/12
    USPC ........................... 700/186–193; 318/592–595
    See application file for complete search history.

(56) References Cited

U.S. PATENT DOCUMENTS

| | | | |
|---|---|---|---|
| 5,760,561 A * | 6/1998 | Chinju | ................ G03F 7/70691 |
| | | | 318/593 |
| 5,798,927 A | 8/1998 | Cutler et al. | |
| 5,847,960 A | 12/1998 | Cutler et al. | |
| 2003/0112547 A1 | 6/2003 | Koso et al. | |
| 2007/0040527 A1 | 2/2007 | Cardinale et al. | |

FOREIGN PATENT DOCUMENTS

| | | |
|---|---|---|
| JP | 2003-005839 | 1/2003 |
| JP | 2007-095035 | 4/2007 |

OTHER PUBLICATIONS

German Office Action dated Jan. 31, 2018 in German Patent Application No. 11 2012 005 841.0 (with English translation), 12 pages.

* cited by examiner

SERVO CONTROL DEVICE WITH COARSE AND FINE MOVEMENT

FIELD

The present invention relates to a servo control device including a plurality of actuators with respect to one moving direction so as to control both elements in a coordinated manner in a control device such as a laser beam machine or a machine tool.

BACKGROUND

When machining is performed by using a machine such as a laser beam machine or a machine tool, control is performed such that the position of a laser head or a tool with respect to a workpiece follows along a commanded path. This control is referred to as "path control", and the path control is performed by performing servo control such that the actual position of each movable shaft of the machine follows a position command of each movable shaft.

In general machines, one actuator is used with respect to one moving direction. As the actuator, a servo motor is normally used. When servo control is performed by using one actuator with respect to one moving direction, a following error generated due to a response delay of a servo control system becomes a problem. Furthermore, there is another problem in that a high-speed response cannot be realized because there is a limitation in the acceleration of the actuator. When a high-speed operation, such as several tens of m/min or higher, is required, the influence of the following error and a decrease in responsiveness appears particularly noticeably.

In this connection, a plurality of devices have been proposed in which an additional actuator capable of realizing a high-speed response, although having a narrow moving range, is added in addition to conventional actuators, so as to control the motion in one moving direction by using two actuators, which are a coarse-movement actuator and a fine-movement actuator.

CITATION LIST

Patent Literatures

Patent Literature 1: Japanese Patent Publication No. 2007-95035
Patent Literature 2: Japanese Patent Application Laid-open No. H7-168525

SUMMARY

Technical Problem

However, according to the conventional techniques mentioned above, for example in Patent Literature 1, although the coarse-movement and fine-movement commands are generated according to predetermined conditions, a response delay of the servo system occurs with respect to each command. Therefore, there is a problem in that an integrated position response obtained by combining a coarse-movement servo response and a fine-movement servo response does not correctly follow the integrated position command obtained by combining a coarse-movement position command and a fine-movement position command.

Furthermore, in Patent Literature 2, the coarse-movement position response is determined on the basis of the response of the feedback control system. Because the feedback control system needs to ensure stability, the response has a limitation. Particularly, a high-speed response causes the control system to be unstable, and thus it is difficult in many cases to realize a high-speed response. Further, in both techniques of Patent Literatures 1 and 2, an inertia force is generated in a fine movement shaft due to acceleration and deceleration of a coarse movement shaft, thereby causing an error in the response of the fine movement shaft.

The present invention has been achieved to solve the above problems, and an object of the present invention is to provide a servo control device that can perform control such that an integrated position of a coarse movement shaft and a fine movement shaft follows a commanded integrated shaft position, without causing an error due to a response delay and an inertia force, and can set responses of the coarse movement shaft and the fine movement shaft freely.

Solution to Problem

According to the present invention in order to solve the above mentioned problems and achieve the object, a servo control device including a coarse-movement shaft motor that drives a coarse movement shaft that performs a linear movement in a determined axial direction, and a fine-movement shaft motor that drives a fine movement shaft that is attached to a movable part of the coarse movement shaft and performs a linear movement on the movable part of the coarse movement shaft, and controlling a position of an integrated shaft determined on a basis of a position of the coarse movement shaft and a position of the fine movement shaft, including a coarse-movement reference model unit that calculates a coarse-movement model position by performing a predetermined filter computation on a basis of a position command; a coarse-movement follow-up control unit that controls the coarse-movement shaft motor such that a coarse-movement-shaft motor position follows the coarse-movement model position on a basis of the coarse-movement-shaft motor position provided from the coarse-movement shaft motor and the coarse-movement model position; an integrated reference model unit that calculates an integrated model position by performing a predetermined filter computation on a basis of a position command; and a fine-movement follow-up control unit that controls the fine-movement shaft motor such that a fine-movement-shaft motor position follows a fine-movement model position on a basis of the fine-movement-shaft motor position provided from the fine-movement shaft motor and the fine-movement model position obtained from the integrated model position and the coarse-movement model position.

According to an embodiment, the integrated reference model unit further includes a parameter changing unit that sets a response time constant of the integrated model position with respect to the position command, in a range in which the fine-movement model position does not exceed a movable range of the fine movement shaft, on a basis of a change ratio of the position command and a response time constant of the coarse-movement model position with respect to the position command of the coarse-movement reference model unit.

According to an embodiment, the coarse reference model unit further includes a parameter changing unit that sets a response time constant of the coarse model position with respect to the position command, in a range in which the fine model position does not exceed a movable range of the fine movement shaft, on a basis of a change ratio of the position command and a response time constant of the integrated model position with respect to the position command of the integrated reference model unit.

Advantageous Effects of Invention

According to the present invention, it is possible to perform control such that an integrated position of a coarse movement shaft and a fine movement shaft can follow a commanded integrated shaft position perfectly and to freely set the responses of the coarse movement shaft and the fine movement shaft. In addition, an effect is obtained where the inertia force generated in the fine movement shaft at the time of acceleration and deceleration of the coarse movement shaft does not affect the motion of the fine movement shaft.

DESCRIPTION OF EMBODIMENTS

Exemplary embodiments of a servo control device according to the present invention will be explained below in detail with reference to the drawings. The present invention is not limited to the embodiments.

First Embodiment

Figure 1:
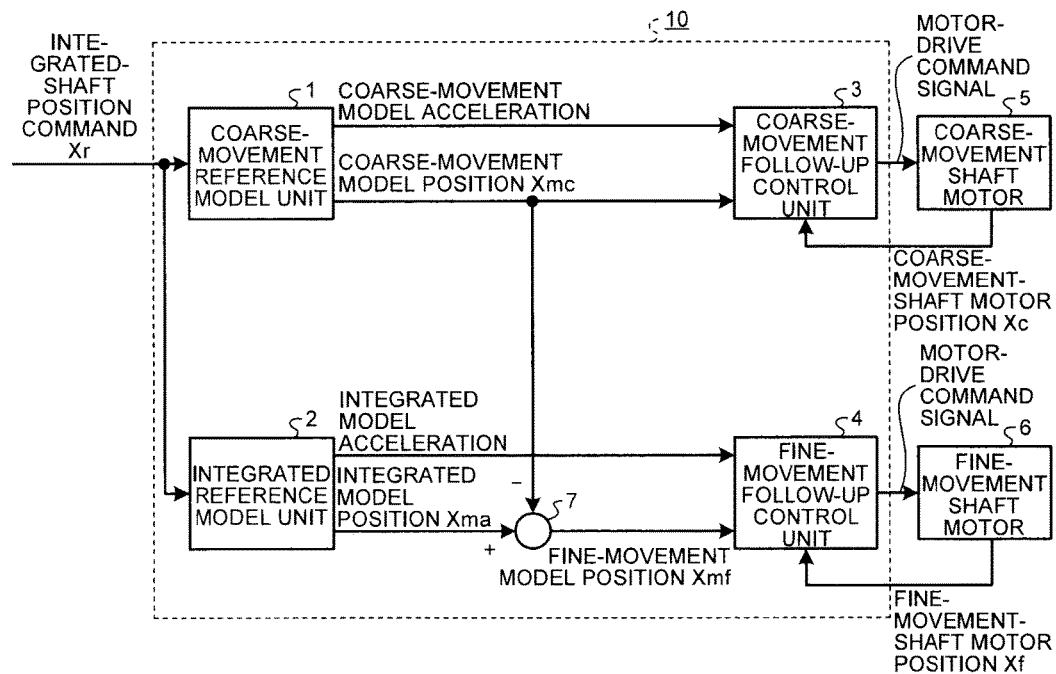
FIG. 1 is a block diagram of the configuration of a servo control device according to a first embodiment of the present invention.

FIG. 1 is a block diagram of the configuration of a servo control device 10 according to a first embodiment of the present invention. The position of an integrated shaft combining a coarse movement shaft and a fine movement shaft is input to the servo control device 10 as an integrated-shaft position command. The motor positions of the shafts of a coarse-movement shaft motor 5 and a fine-movement shaft motor 6 are input to the servo control device 10 as a feedback signal. A position detector, such as a rotary encoder or a linear scale, is attached to the coarse-movement shaft motor 5 and the fine-movement shaft motor 6, and the motor positions of the shafts are detected by these position detectors. The servo control device 10 outputs a motor-drive command signal for driving the motors to the coarse-movement shaft motor 5 and the fine-movement shaft motor 6.

In the servo control device 10, the integrated-shaft position command described above is input to a coarse-movement reference model unit 1 and an integrated reference model unit 2. The coarse-movement reference model unit 1 outputs a coarse-movement model position and a coarse-movement model acceleration by computation, which will be described later. The integrated reference model unit 2 outputs an integrated model position and an integrated model acceleration by computation, which will be described later. The coarse-movement model position and the coarse-movement model acceleration are input to a coarse-movement follow-up control unit 3, and the coarse-movement follow-up control unit 3 outputs a motor-drive command signal for causing the coarse-movement-shaft motor position input separately from the coarse-movement shaft motor 5 to follow the coarse-movement model position. In a subtractor 7, the coarse-movement model position is subtracted from the integrated model position, and the subtraction result, that is, a difference between the integrated model position and the coarse-movement unit model position is output as a fine-movement model position. The fine-movement model position and the integrated model acceleration are input to a fine-movement follow-up control unit 4, and the fine-movement follow-up control unit 4 outputs a motor-drive command signal for causing the fine-movement-shaft motor position input separately from the fine-movement shaft motor 6 to follow the fine-movement model position.

In the present embodiment, a rotary servo motor is used for the coarse-movement shaft motor 5 and the fine-movement shaft motor 6. Therefore, the motor-drive command signal is a torque command signal. The coarse-movement shaft motor 5 and the fine-movement shaft motor 6 generate a torque according to torque command signals, which are the motor-drive command signals, to drive the movable parts of the coarse movement shaft and the fine movement shaft.

Figure 7:
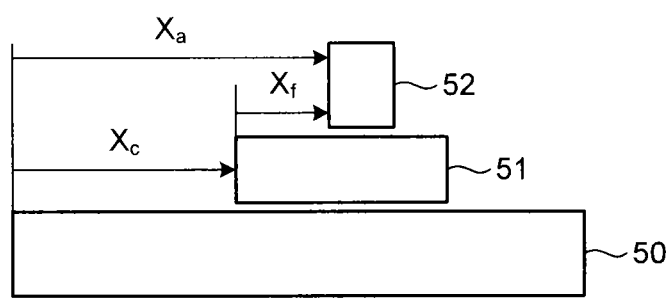
FIG. 7 is a schematic diagram of the relationship between a coarse movement shaft and a fine movement shaft according to the first to fourth embodiments of the present invention.

In the first embodiment, the coarse movement shaft and the fine movement shaft to be controlled by the servo control device 10 each perform a linear movement in an axial direction determined by a movable mechanism including a rotary servo motor and a ball screw. The coarse movement shaft includes a fixed part and a movable part that moves linearly. The fine movement shaft is attached to the movable part of the coarse movement shaft, and the movable part of the fine movement shaft moves linearly on the movable part of the coarse movement shaft. The moving directions of the coarse movement shaft and the fine movement shaft are the same. The position of the movable part of the fine movement shaft with respect to the fixed part of the coarse movement shaft is the position of the integrated shaft. FIG. 7 schematically depicts the relationship between the motor positions of the coarse movement shaft and the fine movement shaft. A coarse-movement-shaft movable part 51 is arranged on a coarse-movement-shaft fixed part 50, and a fine-movement-shaft movable part 52 is arranged on the coarse-movement-shaft movable part 51. The servo control device 10 according to the first embodiment controls a motor position Xa of the integrated-shaft to a commanded position.

Figure 2:
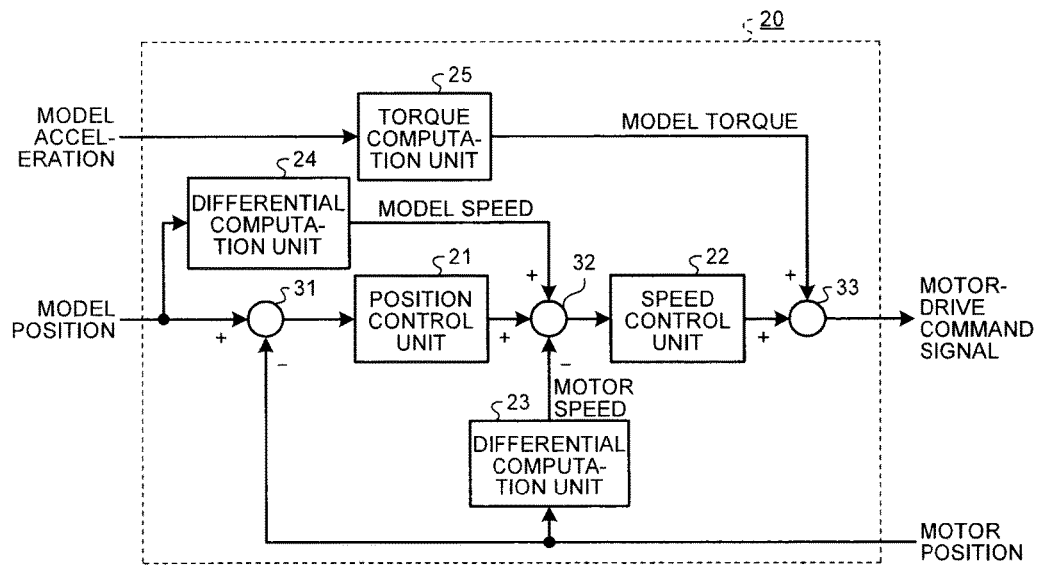
FIG. 2 is a block diagram of the internal configuration of a follow-up control unit according to the first embodiment of the present invention.

FIG. 2 is a block diagram of the internal configuration of the coarse-movement follow-up control unit 3 and the fine-movement follow-up control unit 4 according to the first embodiment. The internal block configurations of the coarse-movement follow-up control unit 3 and the fine-movement follow-up control unit 4 are the same and are collectively referred to as a "follow-up control unit 20". The follow-up control unit 20 receives as an input the model position, the model acceleration, and the motor position, and outputs the motor-drive command signal. The coarse-movement follow-up control unit 3 receives the coarse-movement model position as the model position, the coarse-movement model acceleration as the model acceleration, and the coarse-movement-shaft motor position as the motor position, and outputs a coarse-movement-shaft-motor-drive command signal as the motor-drive command signal. The fine-movement follow-up control unit 4 receives the fine-movement model position as the model position, the integrated model acceleration as the model acceleration, and the fine-movement-shaft motor position as the motor position, and outputs the fine-movement-shaft-motor-drive command as the motor-drive command signal.

The internal configuration of the follow-up control unit 20 is as described below. In a subtractor 31, the motor position is subtracted from the model position, and the subtraction result, that is, a difference between the model position and the motor position is input to a position control unit 21. The position control unit 21 performs control such as proportional control. The model position is input to a differential computation unit 24 and a model speed that is a first derivative of the model position is computed. As for the motor position, in a similar manner, a differential computation unit 23 computes a motor speed that is a first derivative of the motor position. An adder-subtractor 32 performs a process of adding the model speed to the output of the position control unit 21 and subtracting the motor speed therefrom, and the output of the adder-subtractor 32 is input to a speed control unit 22. The speed control unit 22 performs control such as proportional-integral control. Meanwhile, the model acceleration is input to a torque computation unit 25 to compute a model torque. The computation of the model torque is performed by multiplying the model acceleration by the inertia of the movable part. As the inertia of the movable part, a design value or an identification value is used. The output of the torque computation unit 25 is added to the output of the speed control unit 22 by an adder 33, and the addition result is output as the motor-drive command signal.

The computation in the coarse-movement reference model unit 1 and the integrated reference model unit 2 is explained next. A filter having high-frequency cutoff characteristics (high-frequency-band cutoff characteristics) is used for the reference model units. The coarse-movement reference model unit 1 outputs the result of the filter computation with respect to the input integrated-shaft position command as the coarse-movement model position. The coarse-movement reference model unit 1 also outputs a second derivative of the coarse-movement model position as the coarse-movement model acceleration. The integrated reference model unit 2 outputs the result of the filter computation with respect to the input integrated-shaft position command as the integrated model position. The integrated reference model unit 2 also outputs a second derivative of the integrated model position as the integrated model acceleration.

The model acceleration that is a second derivative of the model position needs to be used in addition to the model position that is the filter output, and in order to obtain a smooth model acceleration, it is desirable that the coarse-movement reference model unit 1 and the integrated reference model unit 2 are second or higher-order low-pass filters. The differential computation at the time of computing the model acceleration can be performed by a pseudo differentiation, that is, a method of dividing a difference by a sample cycle, or can be extracted from an integrator in the filter by using a method shown in, for example, Japanese Patent Application Laid-Open No. 2011-145884. By using the filter having high-frequency cutoff characteristics (high-frequency-band cutoff characteristics) for the coarse-movement reference model unit 1 and the integrated reference model unit 2, the model position and the model acceleration that is a second derivative of the model position can be smoothed and an abrupt change can be suppressed, thereby enabling each drive shaft to be driven smoothly.

An operation of the servo control device 10 according to the first embodiment is explained next. It is assumed here that the coarse-movement-shaft motor position is Xc, the fine-movement-shaft motor position is Xf, and the integrated-shaft motor position is Xa. As shown in FIG. 7, the integrated-shaft motor position Xa is expressed by the sum of the coarse-movement-shaft motor position Xc and the fine-movement-shaft motor position Xf. It is also assumed that the integrated-shaft position command is Xr, the coarse-movement model position is Xmc, the integrated model position is Xma, and the fine-movement model position is Xmf. The transfer function of the coarse-movement reference model unit 1, that is, a transfer function from the integrated-shaft position command as an input to the coarse-movement model position as an output is assumed to be Gc(s). The transfer function Gc is expressed by the following quadratic equation in which a denominator polynomial is a Laplace operator s.

$$G_c(s) = \frac{K_{c1}K_{c2}}{s^2 + K_{c2}s + K_{c1}K_{c2}} \qquad (1)$$

where Kc1 and Kc2 are parameters having positive constant values. The transfer function of the integrated reference model unit 2, that is, a transfer function from the integrated-shaft position command as an input to the integrated model position as an output is designated as Ga(s). It is assumed that the transfer function Ga is expressed by the following quadratic equation in which a denominator polynomial is a Laplace operator s.

$$G_a(s) = \frac{K_{a1}K_{a2}}{s^2 + K_{a2}s + K_{a1}K_{a2}} \qquad (2)$$

where Ka1 and Ka2 are parameters having positive constant values.

At this time, the relationship between the integrated-shaft position command Xr and the coarse-movement model position Xmc is expressed by the following equation.

$$X_{mc}(s) = G_c(s)X_r(s) \qquad (3)$$

The equation (3) expresses a time-series signal by a Laplace-transformed s-domain. In the following expressions, an s-domain expression is shown unless otherwise specified. Similarly, the relationship between the integrated-shaft position command Xr and the integrated model position Xma is expressed by the following equation.

$$X_{ma}(s) = G_a(s)X_r(s) \qquad (4)$$

The fine-movement model position Xmf, which is a difference between the integrated model position Xma and the coarse-movement model position Xmc, is expressed by the following equation by using these transfer functions.

$$X_{mf}(s) = X_{ma}(s) - X_{mc}(s) = (G_a(s) - G_c(s))X_r(s) \qquad (5)$$

Because the transfer function Gc of the coarse-movement reference model unit 1 and the transfer function Ga of the integrated reference model unit 2 are both low-pass filters in which a DC gain is 1, when the integrated-shaft position command Xr has a constant value, the fine-movement model position Xmf converges to 0.

With regard to the coarse movement shaft, when it is assumed that the inertia of the movable part of the coarse movement shaft is Jc, the transfer function of the position control unit is Cpc(s), and the transfer function of the speed control unit is Cvc(s), a motor torque τc of the coarse movement shaft is expressed by the following equation on the basis of the relationship of FIGS. 1 and 2.

$$\tau_c(s)=[(X_{mc}(s)-X_c(s))C_{pc}(s)+s(X_{mc}(s)-X_c(s))]C_{vc}(s)+J_cs^2X_{mc}(s) \quad (6)$$

A reaction torque at the time of acceleration and deceleration of the fine movement shaft is applied to the coarse movement shaft as disturbance. However, generally, because the inertia of the coarse movement shaft is sufficiently larger than that of the fine movement shaft, the influence of the disturbance on the coarse movement shaft is sufficiently small. Therefore, the influence of the disturbance of the reaction torque due to acceleration and deceleration of the fine movement shaft is ignored in the equation (6). In addition, the drive unit is modeled by a rigid body and the influence of other disturbances such as friction is also ignored.

Furthermore, the motion equation of the coarse movement shaft is expressed by the following equation.

$$\tau_c=(s)=J_cs^2X_c(s) \quad (7)$$

When the equations (6) and (7) are simultaneously solved, the following equation can be obtained.

$$X_c(s)=X_{mc}(s) \quad (8)$$

That is, the coarse-movement-shaft motor position Xc perfectly follows the coarse-movement model position Xmc, regardless of the characteristics of the coarse-movement follow-up control unit 3.

Next, with regard to the fine movement shaft, when it is assumed that the inertia of the movable part of the fine movement shaft is Jf, the transfer function of the position control unit is Cpf(s), and the transfer function of the speed control unit is Cvf(s), a motor torque τf of the fine movement shaft is expressed by the following equation on the basis of the relationship of FIGS. 1 and 2.

$$\tau_f(s)=[(X_{mf}(s)-X_f(s))C_{pf}(s)+s(X_{mf}(s)-X_f(s))]C_{vf}(s)+J_fs^2X_{ma}(s) \quad (9)$$

Corresponding to FIG. 1, the last term on the right side of the equation (9) is not a second derivative of the fine-movement model position but is the integrated model acceleration, that is, a second derivative of the integrated model position.

Further, the motion equation of the fine movement shaft is expressed by the following equation.

$$\tau_f(s)=J_fs^2X_f(s)+J_fs^2X_c(s) \quad (10)$$

The second term on the right side of the equation (10) expresses the inertia force generated by acceleration and deceleration of the coarse movement shaft. In the equation (10), the drive unit is modeled by a rigid body, and the influence of disturbances such as friction is ignored.

When the equations (9) and (10) are simultaneously solved, the following equation can be obtained.

$$X_f(s)=X_{mf}(s) \quad (11)$$

That is, the fine-movement-shaft motor position Xf perfectly follows the fine-movement model position Xmf regardless of the characteristics of the fine-movement follow-up control unit 4. When the integrated-shaft position command Xr has a constant value, the fine-movement model position Xmf converges to 0. Therefore, the fine-movement-shaft motor position Xf also converges to 0.

Accordingly, the motor position of the integrated shaft is expressed by the following equation.

$$X_a(s)=X_{mc}(s)+X_{mf}(s)=X_{ma}(s)=G_a(s)X_r \quad (12)$$

That is, the integrated-shaft motor position Xa perfectly follows the integrated model position Xma, which is an output of the integrated reference model unit 2, regardless of the characteristics of the coarse-movement reference model unit 1 and the follow-up control unit. Because the integrated reference model unit 2 does not use the feedback signal, a free response can be set without deteriorating the stability of the control system.

Setting of the reference model unit is explained next. It is assumed here that a response delay in a steady state of the coarse-movement reference model unit 1 is a response time constant Tc of the coarse-movement reference model unit 1. When a final-value theorem of Laplace transformation is used, the response time constant Tc is expressed by the following equation for the parameter Kc1 of a coarse-movement reference model.

$$T_c = \lim_{s \to 0} \frac{1-G_c(s)}{s} = \frac{1}{K_{c1}} \quad (13)$$

Similarly, when it is assumed that the response delay in a steady state of the integrated reference model unit 2 is a response time constant Ta of the integrated reference model unit 2, the response time constant Ta is expressed by the following equation for the parameter Ka1 of an integrated reference model.

$$T_a = \lim_{s \to 0} \frac{1-G_a(s)}{s} = \frac{1}{K_{a1}} \quad (14)$$

When the integrated-shaft position command Xr changes at a constant speed, the change ratio thereof is assumed to be a command speed Fr. At this time, the following error becomes the largest at the time of the steady state, and the following error in the steady state is expressed by the product of the command speed and the response time constant. That is, the largest value of the following error of the coarse movement shaft becomes Fr·Tc, and the largest value of the following error of the integrated shaft becomes Fr·Ta. The largest value of the following error of the fine movement shaft becomes Fr·(Tc−Ta).

As shown in FIG. 7, the movable range of the fine movement shaft becomes smaller than the movable range of the coarse movement shaft due to the structural relationship that the fine-movement-shaft movable part 52 is attached to the coarse-movement-shaft movable part 51. When the movable range of the fine movement shaft is in a range of −L to +L centering on the original point, that is, a point at which the fine-movement-shaft motor position Xf is 0, the largest value Fr·(Tc−Ta) of the following error of the fine movement shaft only needs to be equal to or less than L, in order to avoid that the fine-movement model position Xmf exceeds the movable range.

A case where the response time constant of the coarse-movement reference model is fixed to Tc is assumed here. In this case, the response time constant Ta of the integrated reference model is set to be equal to or larger than (Tc-L/Fr) so that the fine-movement model position Xmf does not exceed the movable range L of the fine movement shaft. Because the fine-movement-shaft motor position Xf perfectly follows the fine-movement model position Xmf, if the fine-movement model position Xmf does not exceed the movable range L of the fine movement shaft, the fine-movement-shaft motor position Xf does not also exceed the movable range.

As described above, according to the first embodiment, it is possible to perform control such that the integrated position of the coarse movement shaft and the fine movement shaft perfectly follows the commanded integrated shaft position and to freely set the responses of the coarse movement shaft and the fine movement shaft. Furthermore, the inertia force generated in the fine movement shaft at the time of acceleration and deceleration of the coarse movement shaft can be controlled so as not to affect the motion of the fine movement shaft.

According to the first embodiment, the model position and the model acceleration that is a second derivative of the model position are smoothed, and an abrupt change is suppressed, thereby enabling each drive shaft to be driven smoothly. Further, according to the first embodiment, when the movable range of the fine movement shaft is limited and the response of the coarse movement shaft is desired to be maintained constant, it is possible to perform control such that the position of the fine movement shaft does not exceed the movable range. This operation can be performed by a parameter changing unit (not shown) provided in the servo control device 10.

In the first embodiment, the second-order low-pass filter is used for the responses of the coarse-movement reference model unit 1 and the integrated reference model unit 2. However, a higher-order filter can be also used. By using such a higher-order filter, the response shape of the servo control system can be set with higher flexibility. For example, a smoother response is obtained or a symmetrical response is obtained.

In the computation in the servo control device 10, the order of differentiation and subtraction can be reversed. For example, the coarse-movement model speed obtained by differentiating the coarse-movement model position Xmc once can be output from the coarse-movement reference model unit 1, the integrated model speed obtained by differentiating the integrated model position Xma once can be output from the integrated reference model unit 2, and a difference between the integrated model speed and the coarse-movement model speed can be input to the fine-movement follow-up control unit 4 as the model speed. In this case, the differential computation unit 24 in the fine-movement follow-up control unit 4 is not required.

As described above, according to the servo control device 10 according to the present embodiment, it is possible to perform control such that the integrated position of the coarse movement shaft and the fine movement shaft perfectly follows the commanded integrated shaft position and to freely set the responses of the coarse movement shaft and the fine movement shaft. Furthermore, the inertia force generated in the fine movement shaft at the time of acceleration and deceleration of the coarse movement shaft can be controlled so as not to affect the motion of the fine movement shaft.

Second Embodiment

Figure 3:
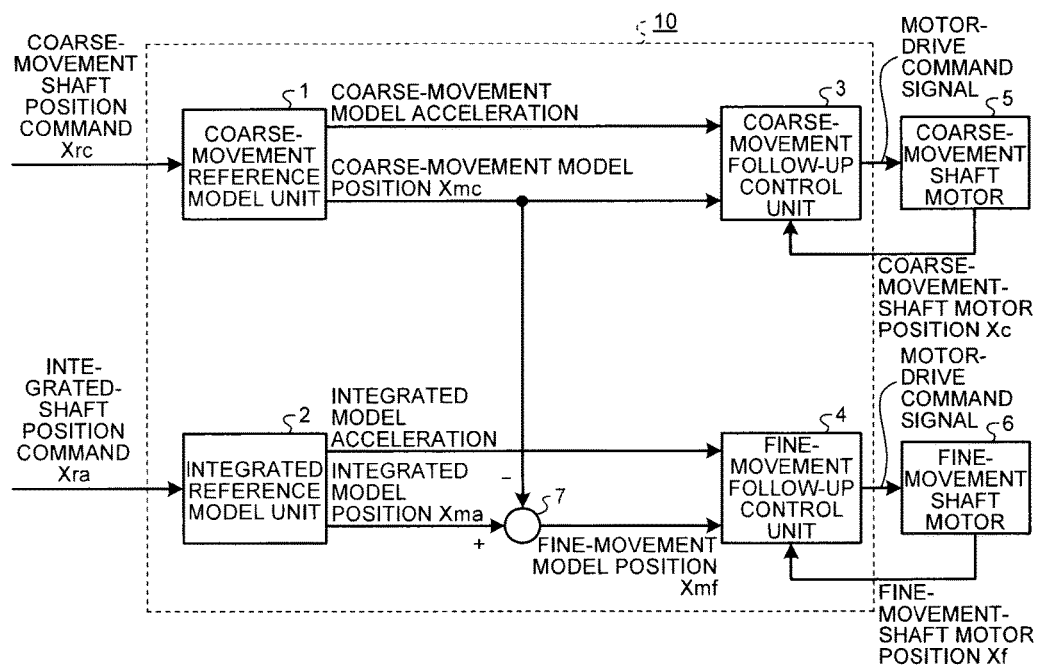
FIG. 3 is a block diagram of the configuration of a servo control device according to a second embodiment of the present invention.

FIG. 3 is a block diagram of the configuration of the servo control device 10 according to a second embodiment of the present invention. The second embodiment is different from the first embodiment in that a coarse-movement shaft position command is used as an input to the coarse-movement reference model unit 1, instead of an integrated-shaft position command.

It is assumed here that the response time constant of the integrated reference model is fixed to Ta. In order to set the largest value Fr·(Tc−Ta) of the following error of the fine movement shaft to be equal to or less than L, in this case, the response time constant Tc of the coarse-movement reference model is set to be equal to or less than (Ta+L/Fr), thereby preventing the fine-movement model position Xmf from exceeding the movable range L of the fine movement shaft. Because the fine-movement-shaft motor position Xf perfectly follows the fine-movement model position Xmf, if the fine-movement model position Xmf does not exceed the movable range L, the fine-movement-shaft motor position Xf does not also exceed the movable range.

In a similar manner to the first embodiment, when the coarse-movement-shaft motor position Xc is expressed by an equation, assuming that the coarse-movement shaft position command is Xrc and the integrated-shaft position command is Xra, the coarse-movement-shaft motor position Xc is expressed by the following equation.

$$X_c(s)=X_{mc}(s)=G_c(s)X_{rc}(s) \quad (15)$$

That is, the coarse-movement-shaft motor position Xc perfectly follows the response of the coarse-movement reference model unit 1 when the coarse-movement shaft position command Xrc is input. Furthermore, the integrated-shaft motor position Xa is expressed by the following equation.

$$X_a(s)=X_{ma}(s)=G_a(s)X_{ra}(s) \quad (16)$$

Further, the fine-movement-shaft motor position Xf is expressed by the following equation.

$$X_f(s)=X_{ma}(s)-X_{mc}(s)=G_a(s)X_{ra}(s)-G_c(s)X_{rc}(s) \quad (17)$$

When the coarse-movement shaft position command Xrc and the integrated-shaft position command Xra each take a constant value, the coarse-movement-shaft motor position Xc becomes equal to the coarse-movement shaft position command Xrc, the integrated-shaft motor position Xa becomes equal to the integrated-shaft position command Xra, and thus the fine-movement-shaft motor position Xf becomes equal to a difference Xra-Xrc between the integrated-shaft position command and the coarse-movement shaft position command.

In the first embodiment, only the integrated-shaft position command Xr is issued, and the fine-movement-shaft motor position Xf converges to 0 if the integrated-shaft position command Xr has a constant value. On the other hand, according to the second embodiment, it is possible to perform control such that the integrated position of the coarse movement shaft and the fine movement shaft perfectly follows the commanded integrated shaft position and to freely set the responses of the coarse movement shaft and the fine movement shaft. The inertia force generated in the fine movement shaft at the time of acceleration and deceleration of the coarse movement shaft can be controlled so as not to affect the motion of the fine movement shaft. Furthermore, the positions of the coarse movement shaft and the fine movement shaft can be controlled independently so that they are predetermined positions by commanding the position of the coarse movement shaft in addition to the position of the integrated shaft to perform follow-up control.

According to the second embodiment, when the movable range of the fine movement shaft is limited and the response of the integrated shaft is desired to be maintained constant, it is possible to perform control such that the position of the fine movement shaft does not exceed the movable range. This control can be performed by a parameter changing unit (not shown) provided in the servo control device 10.

In the second embodiment, the integrated-shaft position command Xra and the coarse-movement shaft position command Xrc are provided as an input. However, the integrated-shaft position command and the fine-movement shaft position command can be provided. In this case, the coarse-movement shaft position command is obtained by subtracting the fine-movement shaft position command from the integrated-shaft position command. Alternatively, the coarse-movement shaft position command and the fine-movement shaft position command can be provided. In this case, the integrated-shaft position command is obtained by adding the coarse-movement shaft position command and the fine-movement shaft position command.

Third Embodiment

Figure 4:
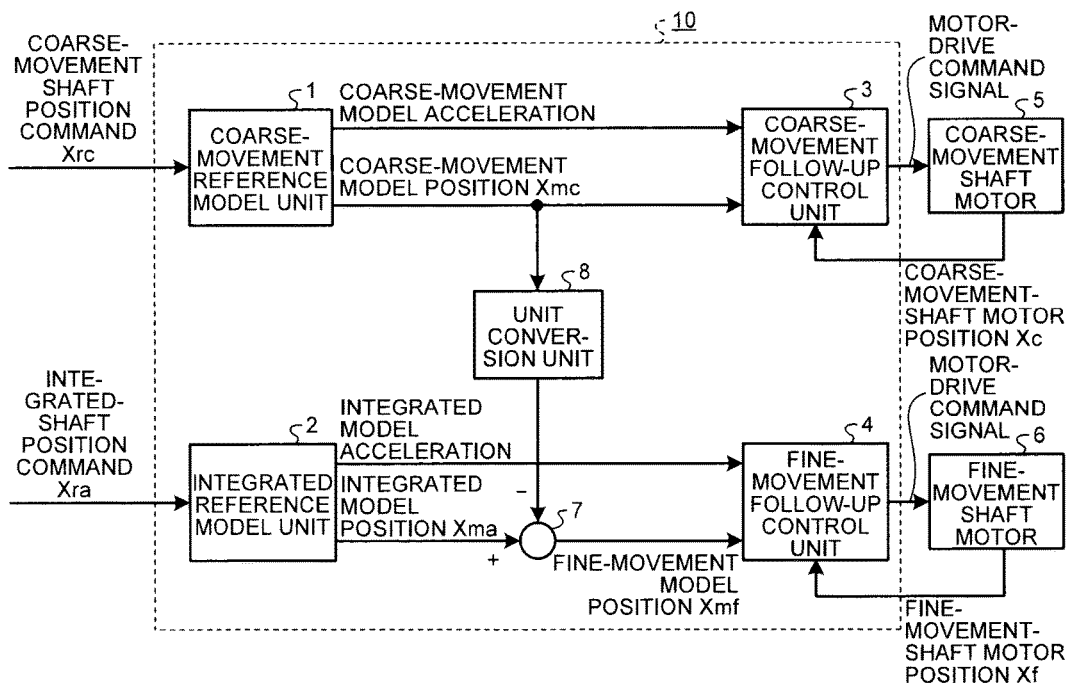
FIG. 4 is a block diagram of the configuration of a servo control device according to a third embodiment of the present invention.

FIG. 4 is a block diagram of the configuration of the servo control device 10 according to a third embodiment of the present invention. The third embodiment is substantially the same as the second embodiment. However, the third embodiment is different from the second embodiment in that the coarse-movement model position Xmc is input to a unit conversion unit 8, the output thereof is subtracted from the integrated model position Xma, and the result of the subtraction is set as the fine-movement model position Xmf. In the third embodiment, the coarse movement shaft is driven by a rotary servo motor and a ball screw, and the fine movement shaft is driven by a linear servo motor. As a point different from the second embodiment, at the time of subtracting the coarse-movement model position Xmc from the integrated model position Xma, the output obtained by inputting the coarse-movement model position Xmc to the unit conversion unit 8 is subtracted from the integrated model position Xma. That is, the coarse-movement model position Xmc is first converted to a unit of control of the fine movement shaft and is then subtracted from the integrated model position Xma.

Figure 5:
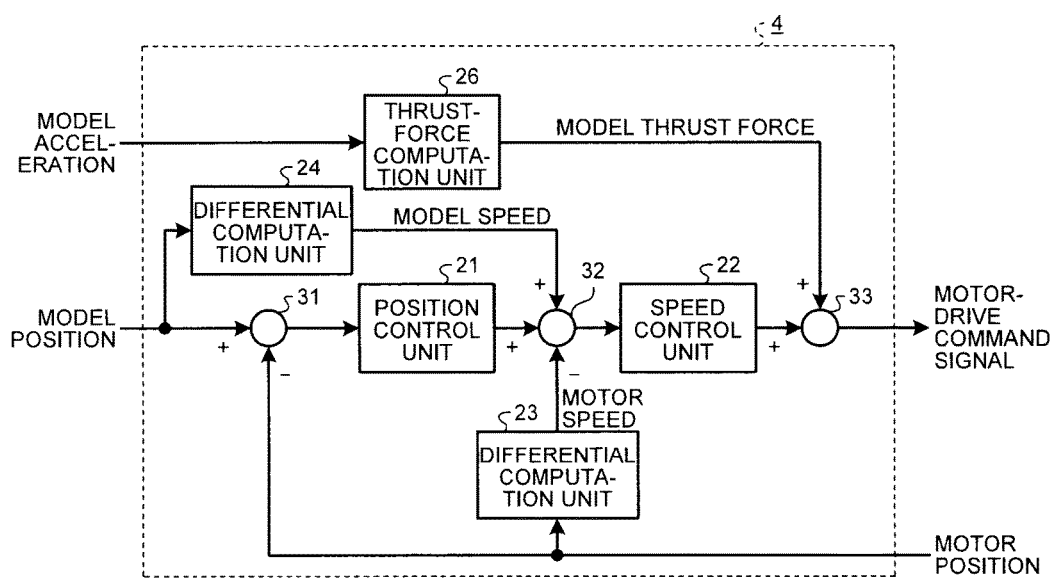
FIG. 5 is a block diagram of the internal configuration of a fine-movement follow-up control unit according to the third embodiment of the present invention.

In the third embodiment, the configuration in the block diagram shown in FIG. 5 is used for the fine-movement follow-up control unit 4 of the fine movement shaft. FIG. 5 is different from FIG. 2 in that the torque computation unit 25 is replaced by a thrust-force computation unit 26 responsive to the rotation servo motor changing to a linear serve motor, and the motor-drive command signal is not a torque command but is a thrust force command. The thrust-force computation unit 26 computes a model thrust force by multiplying the model acceleration by the gross mass of the movable part of the fine movement shaft.

The coarse movement shaft is driven by a rotary servo motor; therefore, the unit of control is a rotation angle (rad). However, the fine movement shaft is driven by a linear servo motor; therefore, the unit of control is length (m). Therefore, the unit conversion unit 8 performs conversion of the units by dividing the input coarse-movement model position by $2\pi$ and multiplying the result thereof by the lead of the ball screw, that is, a distance that the movable part moves when the rotary servo motor rotates once.

As described above, according to the third embodiment, it is possible to perform control such that the integrated position of the coarse movement shaft and the fine movement shaft perfectly follows the commanded integrated shaft position and to freely set the responses of the coarse movement shaft and the fine movement shaft. Furthermore, the inertia force generated in the fine movement shaft at the time of acceleration and deceleration of the coarse movement shaft can be controlled so as not to affect the motion of the fine movement shaft. Further, for example, even in a case where the unit of control of the position control system is different in the coarse movement shaft and the fine movement shaft, such that the coarse movement shaft is driven by the rotation motor and the fine movement shaft is driven by the linear motor, the coarse movement shaft and the fine movement shaft are controlled in a coordinated manner.

Even in a case where the unit of control of the position control system is different in the coarse movement shaft and the fine movement shaft, such that the coarse movement shaft is driven by the rotary servo motor and the ball screw, and the fine movement shaft is driven by the linear servo motor, the integrated-shaft position command can be input to both the coarse-movement reference model unit 1 and the integrated reference model unit 2 as the position command in a similar manner to the first embodiment. Alternatively, the integrated-shaft position command and the fine-movement shaft position command can be provided as the position command. In this case, the coarse-movement shaft position command is obtained by subtracting the fine-movement shaft position command from the integrated-shaft position command. Furthermore, the coarse-movement shaft position command and the fine-movement shaft position command can be provided. In this case, the integrated-shaft position command is obtained by adding the coarse-movement shaft position command and the fine-movement shaft position command.

Fourth Embodiment

Figure 6:
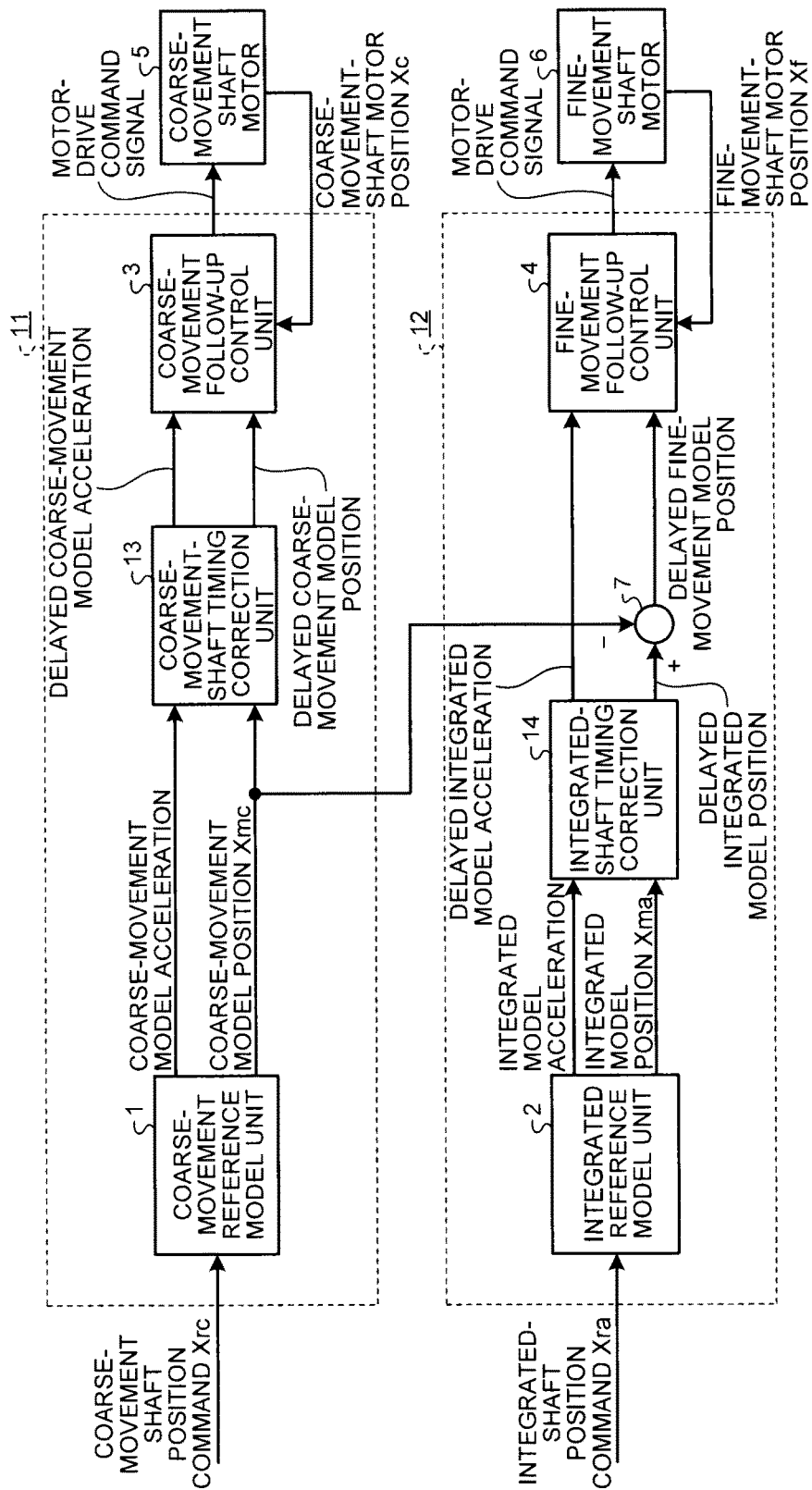
FIG. 6 is a block diagram of the configuration of a coarse-movement-shaft servo control device and a fine-movement-shaft servo control device according to a fourth embodiment of the present invention.

FIG. 6 is a block diagram of the configuration of a coarse-movement-shaft servo control device 11 and a fine-movement-shaft servo control device 12 according to a fourth embodiment of the present invention. The configuration is substantially the same as that of the servo control device 10 shown in FIG. 3 according to the second embodiment. However, the configuration is different from that of the servo control device 10 in that the servo control device is separated into the coarse-movement-shaft servo control device 11 and the fine-movement-shaft servo control device 12. Another point different from the second embodiment is that the output obtained by inputting the coarse-movement model position Xmc and the coarse-movement model acceleration to a coarse-movement-shaft timing correction unit 13 is input to the coarse-movement follow-up control unit 3 as a delayed coarse-movement model position and a delayed coarse-movement model acceleration. Furthermore, a point different from the second embodiment is that the output obtained by inputting the integrated model position Xma and the integrated model acceleration to an integrated-shaft timing correction unit 14 is designated as a delayed integrated model position and a delayed integrated model acceleration, and a difference between the delayed integrated model position and the coarse-movement model position of the coarse-movement-shaft servo control device 11 is designated as a delayed fine-movement model position, and the delayed fine-movement model position and the delayed integrated model acceleration are input to the fine-movement follow-up control unit 4.

When the configuration is such that the coarse-movement-shaft servo control device 11 and the fine-movement-shaft servo control device 12 are separated, the coarse-movement model position Xmc needs to be transmitted from the coarse-movement-shaft servo control device 11 to the fine-movement-shaft servo control device 12. When the time required for communication at this time is not negligible with respect to the response time constant of the servo control system, an error occurs to a position response of the integrated shaft due to the communication time delay. The coarse-movement-shaft timing correction unit 13 and the integrated-shaft timing correction unit 14 perform computation to delay the timing of the model position and the model acceleration by the communication time delay. In the computation to delay the timing, data for the number of samples corresponding to the time desired to be delayed is sequentially stored and data that is previous by the time desired to be delayed is output.

Also in the present embodiment, the coarse movement shaft can be driven by the rotary servo motor and the ball screw, and the fine movement shaft can be driven by the linear servo motor. If the unit of control in the position control system is different in the coarse movement shaft and the fine movement shaft in this manner, by providing the unit conversion unit 8 shown in FIG. 4 as explained in the third embodiment, the delayed fine-movement model position can be obtained. The coarse-movement model position Xmc is converted to the unit of control in the fine movement shaft and is then subtracted from the delayed integrated model position by the subtractor 7 to obtain the delayed fine-movement model position, and the delayed fine-movement model position can be input to the fine-movement follow-up control unit 4. In this case, the unit conversion unit 8 can be provided in either the coarse-movement-shaft servo control device 11 or the fine-movement-shaft servo control device 12, or can be provided between the coarse-movement-shaft servo control device 11 and the fine-movement-shaft servo control device 12.

Furthermore, in a similar manner to the first embodiment, the integrated-shaft position command can be input to both the coarse-movement reference model unit 1 and the integrated reference model unit 2 as the position command. Alternatively, the integrated-shaft position command and the fine-movement shaft position command can be provided as the position command. In this case, the coarse-movement shaft position command is obtained by subtracting the fine-movement shaft position command from the integrated-shaft position command. Alternatively, the coarse-movement shaft position command and the fine-movement shaft position command can be provided. In this case, the integrated-shaft position command is obtained by adding the coarse-movement shaft position command and the fine-movement shaft position command.

According to the fourth embodiment, it is possible to perform control such that the integrated position of the coarse movement shaft and the fine movement shaft perfectly follows the commanded integrated shaft position and to freely set the responses of the coarse movement shaft and the fine movement shaft. Furthermore, the inertia force generated in the fine movement shaft at the time of acceleration and deceleration of the coarse movement shaft can be controlled so as not to affect the motion of the fine movement shaft. Further, even if the servo-control devices of the coarse movement shaft and the fine movement shaft cannot be integrated, the coarse movement shaft and the fine movement shaft can be controlled in a coordinated manner.

Furthermore, the invention of the present application is not limited to the above embodiments, and various modifications can be made within the scope of the invention at implementing stages thereof. Further, in the above embodiments, inventions of various stages are included, and various inventions can be extracted by appropriately combining a plurality of constituent elements disclosed herein. For example, even when some constituent elements are omitted from all the constituent elements described in the embodiments, as far as the problems mentioned in the section of Solution to Problem can be solved and the effects mentioned in the section of Advantageous Effects of Invention are obtained, the configuration from which these constituent elements have been omitted can be extracted as an invention. In addition, constituent elements common to different embodiments can be appropriately combined. Furthermore, as would be readily understood in the art, the various "units" described above and shown in the figures may be implemented by processing circuitry, such as a central processing unit (CPU) or one or more processors.

INDUSTRIAL APPLICABILITY

As described above, the servo control device according to the present invention is useful as a servo control device that controls such that the position of a laser head or a tool with respect to a workpiece follows along a commanded path when machining is performed by using a machine such as a laser beam machine or a machine tool, and is particularly suitable as a servo control device that controls the motion in one moving direction by using two actuators, which are a coarse-movement actuator and a fine-movement actuator.

REFERENCE SIGNS LIST

1 coarse-movement reference model unit, 2 integrated reference model unit, 3 coarse-movement follow-up control unit, 4 fine-movement follow-up control unit, 5 coarse-movement shaft motor, 6 fine-movement shaft motor, subtractor, 8 unit conversion unit, 10 servo control device, 11 coarse-movement-shaft servo control device, 12 fine-movement-shaft servo control device, 13 coarse-movement-shaft timing correction unit, 14 integrated-shaft timing correction unit, 20 follow-up control unit, 21 position control unit, 22 speed control unit, 23 differential computation unit, 24 differential computation unit, 25 torque computation unit, 26 thrust-force computation unit, 31 subtractor, 32 adder-subtractor, 33 adder, 50 coarse-movement-shaft fixed part, 51 coarse-movement-shaft movable part, 52 fine-movement-shaft movable part.

The invention claimed is:

1. A servo control device including a coarse-movement shaft motor that drives a coarse movement shaft that performs a linear movement in a determined axial direction, and a fine-movement shaft motor that drives a fine movement shaft that is attached to a movable part of the coarse movement shaft and performs a linear movement on the movable part of the coarse movement shaft, and controlling a position of an integrated shaft determined on a basis of a position of the coarse movement shaft and a position of the fine movement shaft, the device comprising:
processing circuitry configured to implement
a coarse-movement reference model unit that calculates a coarse-movement model position by performing a predetermined filter computation on a basis of a position command;
a coarse-movement follow-up control unit that controls the coarse-movement shaft motor such that a coarse-movement-shaft motor position follows the coarse-movement model position on a basis of the coarsemovement-shaft motor position provided from the coarse-movement shaft motor and the coarse-movement model position;

an integrated reference model unit that calculates an integrated model position by performing a predetermined filter computation on a basis of the position command; and a fine-movement follow-up control unit that controls the fine-movement shaft motor such that a fine-movement-shaft motor position follows a fine-movement model position on a basis of the fine-movement-shaft motor position provided from the fine-movement shaft motor and the fine-movement model position obtained from the integrated model position and the coarse-movement model position, wherein the integrated reference model unit sets a response time constant of the integrated model position with respect to the position command, in a range in which the fine-movement model position does not exceed a movable range of the fine movement shaft, on a basis of a change ratio of the position command and a response time constant of the coarse-movement model position with respect to the position command.

2. The servo control device according to claim 1, wherein the position command is a command related to a position of the integrated shaft, the coarse-movement reference model unit calculates a coarse-movement model acceleration on a basis of a command related to a position of the integrated shaft, the coarse-movement follow-up control unit controls the coarse-movement shaft motor also on a basis of the coarse-movement model acceleration, the integrated reference model unit calculates an integrated model acceleration on a basis of a command related to a position of the integrated shaft, and the fine-movement follow-up control unit controls the fine-movement shaft motor also on a basis of the integrated model acceleration.

3. The servo control device according to claim 2, wherein both a response characteristic of the coarse-movement model position with respect to the position command of the coarse-movement reference model unit and a response characteristic of the integrated model position with respect to the position command of the integrated reference model unit have a high-frequency cutoff characteristic, the coarse-movement model acceleration is a second derivative of the coarse-movement model position, and the integrated model acceleration is a second derivative of the integrated model position.

4. The servo control device according to claim 1, wherein the position command is a command related to a position of the coarse movement shaft and a position of the integrated shaft, the coarse-movement reference model unit calculates the coarse-movement model position and a coarse-movement model acceleration on a basis of a command related to a position of the coarse movement shaft, the coarse-movement follow-up control unit controls the coarse-movement shaft motor also on a basis of the coarse-movement model acceleration, the integrated reference model unit calculates the integrated model position and an integrated model acceleration on a basis of a command related to a position of the integrated shaft, and the fine-movement follow-up control unit controls the fine-movement shaft motor also on a basis of the integrated model acceleration.

5. The servo control device according to claim 4, the processing circuitry being further configured to implement:

a coarse-movement-shaft servo control unit that includes the coarse-movement reference model unit, a coarse-movement-shaft timing correction control unit that delays a timing of each of the coarse-movement model position and the coarse-movement model acceleration by a predetermined time to output a delayed coarse-movement model position and a delayed coarse-movement model acceleration, and the coarse-movement follow-up control unit that controls the coarse-movement shaft motor on a basis of the delayed coarse-movement model position and the delayed coarse-movement model acceleration; and a fine-movement-shaft servo control unit that includes the integrated reference model unit, an integrated-shaft timing correction control unit that delays a timing of each of the integrated model position and the integrated model acceleration by a predetermined time to output a delayed integrated model position and a delayed integrated model acceleration, and the fine-movement follow-up control unit that controls the fine-movement shaft motor on a basis of a delayed fine-movement model position obtained from the delayed integrated model position and the coarse-movement model position and the delayed integrated model acceleration.

6. The servo control device according to claim 5, wherein the delayed fine-movement model position is a difference between the delayed integrated model position and the coarse-movement model position.

7. The servo control device according to claim 4, wherein both a response characteristic of the coarse-movement model position with respect to the position command of the coarse-movement reference model unit and a response characteristic of the integrated model position with respect to the position command of the integrated reference model unit have a high-frequency cutoff characteristic, the coarse-movement model acceleration is a second derivative of the coarse-movement model position, and the integrated model acceleration is a second derivative of the integrated model position.

8. The servo control device according to claim 1, the processing circuitry being further configured to implement a unit conversion unit that outputs the coarse-movement model position after converting a unit of the coarse-movement model position, wherein the fine-movement model position is obtained from the integrated model position and the coarse-movement model position converted by the unit conversion unit.

9. The servo control device according to claim 1, wherein the fine-movement model position is a difference between the integrated model position and the coarse model position.

10. The servo control device according to claim 1, wherein the position command is obtained on a basis of a command related to a position of the integrated shaft and a position of the fine movement shaft, or the position command is obtained on a basis of a command related to a position of the coarse movement shaft and a position of the fine movement shaft.

11. A servo control device including a coarse-movement shaft motor that drives a coarse movement shaft that performs a linear movement in a determined axial direction, and a fine-movement shaft motor that drives a fine movement shaft that is attached to a movable part of the coarse movement shaft and performs a linear movement on the movable part of the coarse movement shaft, and controlling a position of an integrated shaft determined on a basis of a position of the coarse movement shaft and a position of the fine movement shaft, the device comprising:

processing circuitry configured to implement a coarse-movement reference model unit that calculates a coarse-movement model position by performing a predetermined filter computation on a basis of a position command;

a coarse-movement follow-up control unit that controls the coarse-movement shaft motor such that a coarse-movement-shaft motor position follows the coarse-movement model position on a basis of the coarse-movement-shaft motor position provided from the coarse-movement shaft motor and the coarse-movement model position;

an integrated reference model unit that calculates an integrated model position by performing a predetermined filter computation on a basis of the position command; and a fine-movement follow-up control unit that controls the fine-movement shaft motor such that a fine-movement-shaft motor position follows a fine-movement model position on a basis of the fine-movement-shaft motor position provided from the fine-movement shaft motor and the fine-movement model position obtained from the integrated model position and the coarse-movement model position, wherein the coarse reference model unit sets a response time constant of the coarse model position with respect to the position command, in a range in which the fine model position does not exceed a movable range of the fine movement shaft, on a basis of a change ratio of the position command and a response time constant of the integrated model position with respect to the position command.

12. The servo control device according to claim 11, wherein the position command is a command related to a position of the integrated shaft, the coarse-movement reference model unit calculates a coarse-movement model acceleration on a basis of a command related to a position of the integrated shaft, the coarse-movement follow-up control unit controls the coarse-movement shaft motor also on a basis of the coarse-movement model acceleration, the integrated reference model unit calculates an integrated model acceleration on a basis of a command related to a position of the integrated shaft, and the fine-movement follow-up control unit controls the fine-movement shaft motor also on a basis of the integrated model acceleration.

13. The servo control device according to claim 12, wherein both a response characteristic of the coarse-movement model position with respect to the position command of the coarse-movement reference model unit and a response characteristic of the integrated model position with respect to the position command of the integrated reference model unit have a high-frequency cutoff characteristic, the coarse-movement model acceleration is a second derivative of the coarse-movement model position, and the integrated model acceleration is a second derivative of the integrated model position.

14. The servo control device according to claim 11, wherein the position command is a command related to a position of the coarse movement shaft and a position of the integrated shaft, the coarse-movement reference model unit calculates the coarse-movement model position and a coarse-movement model acceleration on a basis of a command related to a position of the coarse movement shaft, the coarse-movement follow-up control unit controls the coarse-movement shaft motor also on a basis of the coarse-movement model acceleration, the integrated reference model unit calculates the integrated model position and an integrated model acceleration on a basis of a command related to a position of the integrated shaft, and the fine-movement follow-up control unit controls the fine-movement shaft motor also on a basis of the integrated model acceleration.

15. The servo control device according to claim 14, the processing circuitry being further configured to implement:

a coarse-movement-shaft servo control unit that includes the coarse-movement reference model unit, a coarse-movement-shaft timing correction control that delays a timing of each of the coarse-movement model position and the coarse-movement model acceleration by a predetermined time to output a delayed coarse-movement model position and a delayed coarse-movement model acceleration, and the coarse-movement follow-up control that controls the coarse-movement shaft motor on a basis of the delayed coarse-movement model position and the delayed coarse-movement model acceleration; and a fine-movement-shaft servo control unit that includes the integrated reference model unit, an integrated-shaft timing correction control that delays a timing of each of the integrated model position and the integrated model acceleration by a predetermined time to output a delayed integrated model position and a delayed integrated model acceleration, and the fine-movement follow-up control unit that controls the fine-movement shaft motor on a basis of a delayed fine-movement model position obtained from the delayed integrated model position and the coarse-movement model position and the delayed integrated model acceleration.

16. The servo control device according to claim 15, wherein the delayed fine-movement model position is a difference between the delayed integrated model position and the coarse-movement model position.

17. The servo control device according to claim 14, wherein both a response characteristic of the coarse-movement model position with respect to the position command of the coarse-movement reference model unit and a response characteristic of the integrated model position with respect to the position command of the integrated reference model unit have a high-frequency cutoff characteristic, the coarse-movement model acceleration is a second derivative of the coarse-movement model position, and the integrated model acceleration is a second derivative of the integrated model position.

18. The servo control device according to claim 11, the processing circuitry being further configured to implement a unit conversion unit that outputs the coarse-movement model position after converting a unit of the coarse-movement model position, wherein the fine-movement model position is obtained from the integrated model position and the coarse-movement model position converted by the unit conversion unit.

19. The servo control device according to claim 11, wherein the fine-movement model position is a difference between the integrated model position and the coarse model position.

20. The servo control device according to claim 11, wherein the position command is obtained on a basis of a command related to a position of the integrated shaft and a position of the fine movement shaft, or the position command is obtained on a basis of a command related to a position of the coarse movement shaft and a position of the fine movement shaft.

* * * * *